United States Patent
Iwama

(10) Patent No.: US 10,253,780 B2
(45) Date of Patent: Apr. 9, 2019

(54) FAN CONTROL APPARATUS AND FAN CONTROL METHOD FOR COMPUTER EQUIPMENT

(71) Applicant: NEC Platforms, Ltd., Kawasaki-shi, Kanagawa (JP)

(72) Inventor: Hideo Iwama, Kawasaki (JP)

(73) Assignee: NEC PLATFORMS, LTD, Kanagawa (JP)

( * ) Notice: Subject to any disclaimer, the term of this patent is extended or adjusted under 35 U.S.C. 154(b) by 76 days.

(21) Appl. No.: 15/465,743

(22) Filed: Mar. 22, 2017

(65) Prior Publication Data

US 2017/0276140 A1  Sep. 28, 2017

(30) Foreign Application Priority Data

Mar. 24, 2016 (JP) .................. 2016-059497

(51) Int. Cl.
*F04D 25/08* (2006.01)
*F04D 27/00* (2006.01)
*G05B 19/416* (2006.01)

(52) U.S. Cl.
CPC ........... *F04D 27/004* (2013.01); *F04D 25/08* (2013.01); *F04D 27/001* (2013.01); *G05B 19/416* (2013.01); *G05B 2219/43147* (2013.01)

(58) Field of Classification Search
None
See application file for complete search history.

(56) References Cited

U.S. PATENT DOCUMENTS

| | | | |
|---|---|---|---|
| 10,007,309 B1* | 6/2018 | Imwalle | G06F 1/206 |
| 2007/0032908 A1* | 2/2007 | Hyland | G06F 11/3058 |
| | | | 700/275 |
| 2008/0232974 A1* | 9/2008 | Tsuchiya | G06F 1/20 |
| | | | 417/14 |
| 2010/0228403 A1 | 9/2010 | Eto | |
| 2012/0265363 A1* | 10/2012 | Hung | F04D 27/004 |
| | | | 700/300 |
| 2012/0305232 A1* | 12/2012 | Noll | F01P 7/042 |
| | | | 165/287 |
| 2017/0082112 A1* | 3/2017 | Barron | F04D 27/004 |
| 2017/0273224 A1* | 9/2017 | Shabbir | G05B 15/02 |

FOREIGN PATENT DOCUMENTS

| | | |
|---|---|---|
| JP | 2010-108324 A | 5/2010 |
| JP | 2010-211269 A | 9/2010 |
| JP | 2011-186515 A | 9/2011 |
| JP | 2014-165303 A | 9/2014 |

* cited by examiner

*Primary Examiner* — Ryan A Jarrett

(57) ABSTRACT

A fan control apparatus is provided for the computer equipment including a fan, a temperature sensor, and a device module (e.g. an add-in card) mounting at least two devices aligned along an air flow. The fan control apparatus determines a revolving speed of the fan for cooling each device based on an inlet temperature and a usage rate of each device. In addition, the fan control apparatus estimates an inlet temperature of a second device, which is disposed in the downstream side of a first device among at least two devices, based on an inlet temperature and a usage rate of the first device. Thus, it is possible to control the fan to cause an adequate amount of cooling air for cooling devices mounted on the device module installed in the computer equipment.

6 Claims, 9 Drawing Sheets

| INLET TEMPERATURE (4a) | USAGE RATE OF DEVICE 5a | INLET TEMPERATURE (4b) |
|---|---|---|
| 30°C | 80%~100% | 40°C |
| 30°C | 50%~79% | 38°C |
| 30°C | 10%~49% | 35°C |
| 30°C | 0%~9% | 32°C |
| 31°C | 80%~100% | 41°C |
| 31°C | 50%~79% | 39°C |
| 31°C | 10%~49% | 36°C |
| 31°C | 0%~9% | 33°C |
| 32°C | 80%~100% | 42°C |
| 32°C | 50%~79% | 40°C |
| 32°C | 10%~49% | 37°C |
| 32°C | 0%~9% | 34°C |
| 33°C | 80%~100% | 43°C |
| 33°C | 50%~79% | 41°C |
| 33°C | 10%~49% | 38°C |
| 33°C | 0%~9% | 35°C |
| 34°C | 80%~100% | 44°C |
| 34°C | 50%~79% | 42°C |
| 34°C | 10%~49% | 39°C |
| 34°C | 0%~9% | 36°C |
| ... | ... | ... |

FIG. 5

| INLET TEMPERATURE (4a) | USAGE RATE OF DEVICE 5a | REVOLVING SPEED OF FAN 1 |
|---|---|---|
| 30°C~34°C | 80%~100% | 7000rpm |
| 30°C~34°C | 50%~79% | 6500rpm |
| 30°C~34°C | 10%~49% | 6000rpm |
| 30°C~34°C | 0%~9% | 4000rpm |
| 35°C~39°C | 80%~100% | 7500rpm |
| 35°C~39°C | 50%~79% | 7000rpm |
| 35°C~39°C | 10%~49% | 6500rpm |
| 35°C~39°C | 0%~9% | 5000rpm |
| 40°C~44°C | 80%~100% | 8000rpm |
| 40°C~44°C | 50%~79% | 7500rpm |
| 40°C~44°C | 10%~49% | 7000rpm |
| 40°C~44°C | 0%~9% | 6000rpm |
| ... | ... | ... |

| INLET TEMPERATURE (4b) | USAGE RATE OF DEVICE 5b | REVOLVING SPEED OF FAN 1 |
|---|---|---|
| 30°C~34°C | 80%~100% | 7000rpm |
| 30°C~34°C | 50%~79% | 6500rpm |
| 30°C~34°C | 10%~49% | 6000rpm |
| 30°C~34°C | 0%~9% | 4000rpm |
| 35°C~39°C | 80%~100% | 7500rpm |
| 35°C~39°C | 50%~79% | 7000rpm |
| 35°C~39°C | 10%~49% | 6500rpm |
| 35°C~39°C | 0%~9% | 5000rpm |
| 40°C~44°C | 80%~100% | 8000rpm |
| 40°C~44°C | 50%~79% | 7500rpm |
| 40°C~44°C | 10%~49% | 7000rpm |
| 40°C~44°C | 0%~9% | 6000rpm |
| ... | ... | ... |

~152b

FAN CONTROL APPARATUS AND FAN CONTROL METHOD FOR COMPUTER EQUIPMENT

CROSS-REFERENCE TO RELATED APPLICATION

The present application claims the priority benefit of Japanese Patent Application No. 2016-59497 filed on Mar. 24, 2016, the subject matter of which is hereby incorporated herein by reference.

BACKGROUND OF THE INVENTION

1. Field of the Invention

The present invention generally relates to computer equipment having a cooling fan to cool an inlet air and/or an outlet air. In particular, the present invention relates to a fan control apparatus and a fan control method for controlling the revolving speed of a cooling fan depending on an internal temperature of computer equipment.

2. Description of Related Art

Generally, computer equipment has its casing equipped with a cooling fan to control a temperature increase due to the heating of devices installed therein. For example, it is possible for the computer equipment to employ the generally-known methods for controlling the operation of a cooling fan as follows.

(1) A temperature sensor is attached to a device inside the computer equipment so as to monitor its temperature, and therefore the computer equipment controls the revolving speed of a cooling fan based on the temperature.

(2) The computer equipment monitors the temperature of an inlet air flowing into a device, and therefore the computer equipment controls the revolving speed of a cooling fan based on the inlet temperature.

(3) The computer equipment monitors a current or power applied to a device while monitoring an inlet temperature so as to estimate the temperature status of a device, and therefore the computer equipment controls the revolving speed of a cooling fan based on the inlet temperature and the current applied to a device.

Conventionally, computer systems are equipped with cooling devices, which are disclosed in documents, namely patent literatures (PLT) or patent documents. For example, PLT 1 discloses a cooling device for a server having a processor and a fan. The temperature of a processor after a predetermined time elapses is estimated based on the current temperature and the operating ratio of a process as well as the revolving speed of a fan and the inlet temperature of a server, and therefore the cooling fan is controlled to operate at target revolving speed when the estimated temperature exceeds a predetermined value. PLT 2 discloses a dynamic revolution control device for a cooling fan installed in a computer having first and second devices. A table is provided to store the relationship between the temperature of a computer, the temperature of a first device, the temperature of a second device, and the revolving speed of a cooling fan, and therefore the revolving speed of a cooling fan is determined with reference to the table. PLT 3 discloses a computer system equipped with a battery-mounted system board and a cooling fan. The computer system changes the operating state of a cooling fan depending on whether or not a battery is being charged, and therefore the computer system prevents a temperature increase inside the casing due to heating of a battery being charged. PLT 4 discloses a cooling method for an electronic device. The electronic device controls the cooling degree of a cooling member depending on the attribute of an extension card attached thereto.

The foregoing methods (1) to (3) suffer from the following drawbacks. It is likely that the method (1) cannot optimally control a cooling fan with respect to a device unable to accept a temperature sensor attached thereto. The method (2) may not actually monitor the temperature status of a device; hence, in the worst case scenario (where a device operates with the maximum power), it may operate a cooling fan at extremely high speed. The method (3) may not appropriately control the temperature of each device with respect to an add-in card including multiple devices having different temperature statuses. The foregoing technologies (e.g. PLT 1, PLT 2, and PLT 4) suffer from those drawbacks. PLT 3 is limited to a battery as a cooling object; hence, it is difficult to apply the technology of PLT 3 to other types of devices.

CITATION LIST

Patent Literature

PLT 1: Japanese Patent Application Publication No. 2010-108324
PLT 2: Japanese Patent Application Publication No. 2010-211269
PLT 3: Japanese Patent Application Publication No. 2011-186515
PLT 4: Japanese Patent Application Publication No. 2014-165303

SUMMARY OF THE INVENTION

The present invention aims to provide a fan control apparatus and a fan control method for appropriately controlling the revolving speed of a cooling fan depending on the temperature status of each device in the computer equipment.

In a first aspect of the invention, a fan control apparatus is provided for the computer equipment including at least two devices aligned along an air flow caused by a fan. The fan control apparatus includes a fan revolving speed determination part configured to determine the revolving speed of a fan for cooling each device based on an inlet temperature and a usage rate of each device, and a temperature estimation part configured to estimate an inlet temperature of a second device, which is disposed in the downstream side of a first device among at least two devices, based on the inlet temperature and the usage rate of the first device.

In a second aspect of the invention, a fan control system is provided for the computer equipment including at least two devices aligned along an air flow. The fan control system includes a fan causing an air flow inside the computer equipment, and a fan control apparatus configured to control the revolving speed of a fan for cooling each of at least two devices aligned along an air flow caused by a fan. The fan control apparatus estimates an outlet temperature of a first device, which is disposed in the upstream side among at least two devices, as an inlet temperature of a second device, which is disposed in the downstream side among at least two devices, based on the inlet temperature and the usage rate of the first device. In addition, the fan control apparatus determines the revolving speed of a fan for cooling each device based on the inlet temperature and the usage rate of each device.

In a third aspect of the invention, computer equipment includes a device module including at least two devices aligned along an air flow, a temperature sensor configured to measure an inlet temperature of the device module, a fan configured to cause an air flow for cooling each device in the device module, a storage unit including a temperature estimation table and a fan control table, and a fan control apparatus configured to control the revolving speed of a fan for cooling each device with reference to the temperature estimation table and the fan control table. As at least two devices, a first device is disposed in the upstream side of an air flow while a second device is disposed in the downstream side of an air flow. The temperature estimation table stores an outlet temperature of each device in correspondence with an inlet temperature and a usage rate of each device while the fan control table stores the revolving speed of a fan in correspondence with the inlet temperature and the usage rate of each device. The fan control apparatus estimates the outlet temperature of the first device as the inlet temperature of the second device with reference to the temperature estimation table using the inlet temperature and the usage rate of the first device. In addition, the fan control apparatus determines the revolving speed of a fan for cooling each device with reference to the fan control table using the inlet temperature and the usage rate of each device.

In a fourth aspect of the invention, a fan control method is provided for the computer equipment including at least two devices aligned along an air flow caused by a fan. As at least two devices, a first device is disposed in the upstream side of an air flow while a second device is disposed in the downstream side of an air flow. The fan control method includes the steps of: determining the revolving speed of a fan for cooling each device based on the inlet temperature and the usage rate of each device; and estimating the inlet temperature of the second device based on the inlet temperature and the usage rate of the first device. In this connection, it is possible to provide a non-transient computer-readable storage medium storing a program causing a computer serving as a fan control apparatus to implement the fan control method.

According to the present invention, it is possible to control a fan at optimum revolving speed depending on the temperature status inside the computer equipment which does not necessarily provide a temperature sensor for each of multiple devices mounted on a device module (e.g. an add-in card). Thus, it is possible to appropriately cool each device mounted on the device module at high efficiency by causing an adequate amount of cooling air depending on the temperature status of each device on the device module.

BRIEF DESCRIPTION OF THE DRAWINGS

FIG. 4 shows an example of a temperature estimation table stored in a storage unit installed in the fan control apparatus.

FIG. 5 shows an example of a fan control table stored in the storage unit of the fan control apparatus.

FIG. 6 shows another example of the fan control table stored in the storage unit of the fan control apparatus.

DETAILED DESCRIPTION OF THE EMBODIMENTS

The present invention will be described in detail by way of examples with reference to the accompanying drawings, wherein the same parts shown in different drawings are denoted using the same reference signs; hence, the detailed descriptions thereof will be omitted as necessary.

Figure 1:
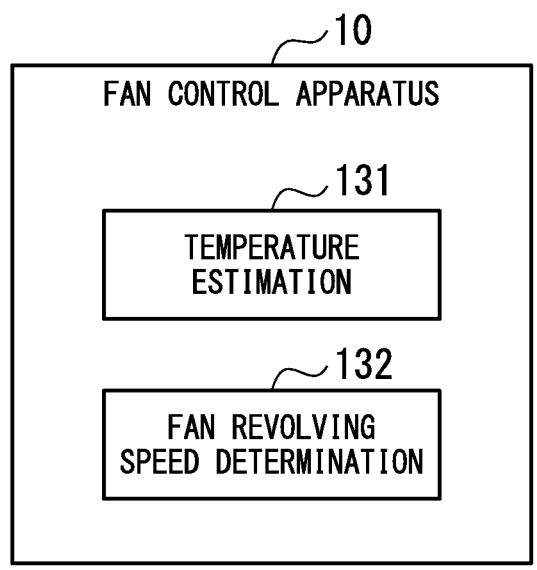
FIG. 1 is a block diagram showing the minimum configuration of a fan control apparatus according to the present invention.

FIG. 1 is a block diagram showing the minimum configuration of a fan control apparatus 10 according to the embodiment of the present invention. The fan control apparatus 10 includes a temperature estimation part 131 and a fan revolving speed determination part 132.

The fan control apparatus 10 is designed control the revolving speed of a fan configured to cause an air flow for cooling a device. The temperature estimation part 131 estimates the temperature in the downstream of a device (i.e. a downstream temperature of a device) based on the temperature in the upstream of a device (i.e. an upstream temperature of a device) and an operating state of a device. This estimation can be applied to two devices that are aligned along a cooling air caused by a fan, namely an upstream device and a downstream device. That is, it is possible for the temperature estimation part 131 to estimate the upstream temperature of a downstream device based on the upstream temperature of an upstream device and the operating state of an upstream device.

The fan revolving speed determination part 132 determines the revolving speed of a fan configured to cool a device based on the upstream temperature of a device and the operating state of a device. This determination can be applied to two devices that are aligned along a cooling air caused by a fan, namely an upstream device and a downstream device. That is, it is possible for the fan revolving speed determination part 132 to determine the revolving speed of a fan suited to an upstream device based on the upstream temperature of an upstream device and the operating state of an upstream device. In addition, it is possible for the fan revolving speed determination part 132 to determine the revolving speed of a fan suited to a downstream device based on the upstream temperature of a downstream device estimated by the temperature estimation part 131 and the operating state of a downstream device.

1. First Embodiment

Figure 2:
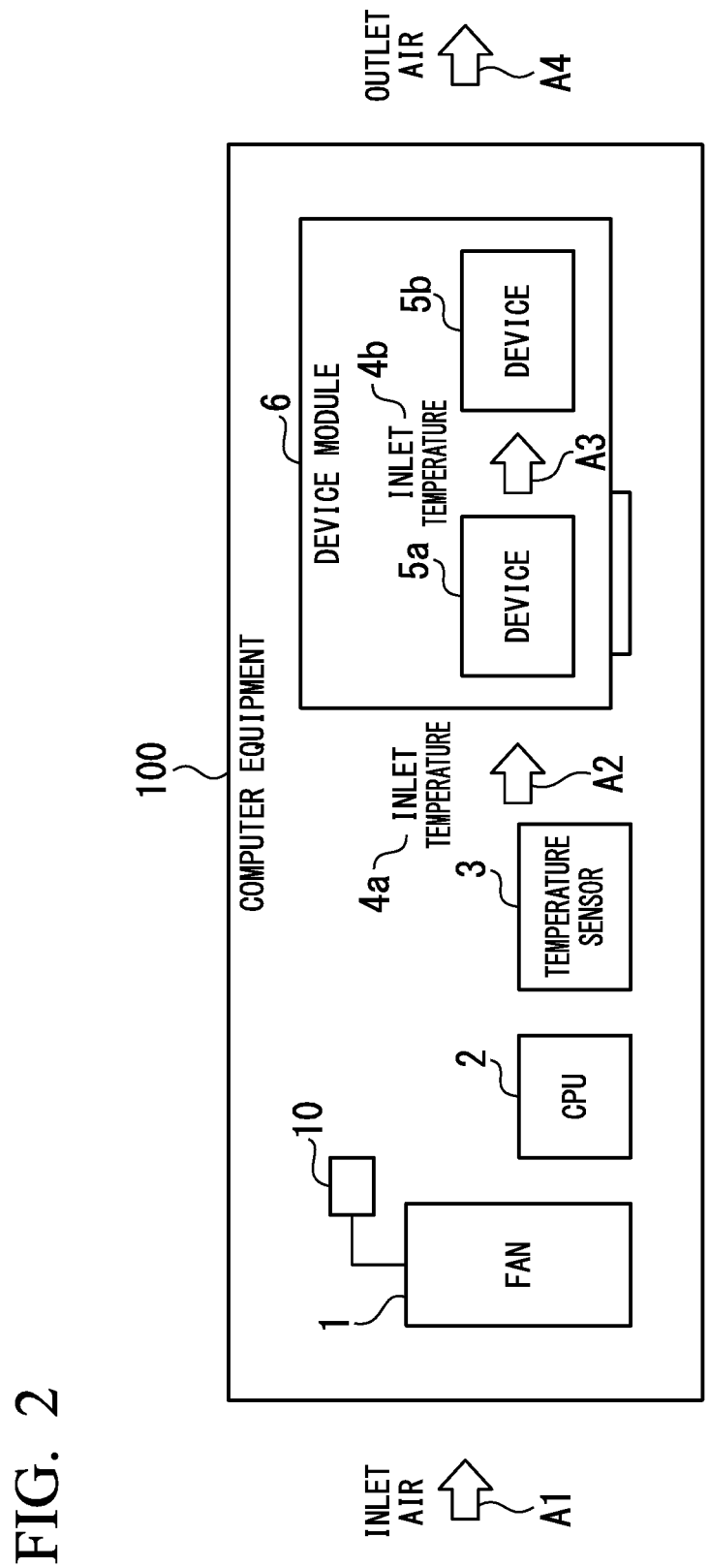
FIG. 2 is a block diagram of computer equipment implementing a fan control system according to the first embodiment of the present invention.

FIG. 2 is a block diagram of computer equipment 100 implementing a fan control system according to the first embodiment of the present invention. The computer equipment 100 includes a fan 1, a CPU 2, a temperature sensor 3, a device module 6, and a fan control apparatus 10 in casing thereof. A pair of devices 5a, 5b are mounted on the device module 6. The device module 6 is detachably attached to the casing of the computer equipment 100. In addition, the devices 5a, 5b are detachably attached to the device a module 6. For example, the device module 6 is an add-in card. In this case, the devices 5a, 5b are integrated circuit components mounted on the add-in card. The fan control system may embrace at least the fan 1 and the fan control device 10.

The fan 1 is a cooling fan configured to decrease the temperature inside the casing of the computer equipment 100. In FIG. 2, arrow symbols A1 through A4 indicate an air flow caused by the fan 1. That is, revolving the fan 1 causes an air flow from the left to the right on the drawing sheet of FIG. 2. This air flow may cool the CPU 2, the devices 5a, 5b, the device module 6, and the like. The temperature sensor 3 is provided to check the temperature status inside the casing of the computer equipment 100. The fan control apparatus 10 controls the revolving speed of the fan based on the temperature information measured by the temperature sensor 3 so as to control the inside temperature of the casing, e.g. the temperature in the surrounding area of the devices 5a, 5b and the device module 6 that may cause heat due to the operation of the computer equipment 100. In this connection, the configurations and arrangements of devices installed in the casing of the computer equipment 100 are not necessarily limited to those shown in FIG. 2. However, the temperature sensor 3 should be positioned in the upstream of any device that may affect the air temperature (which is an object to be controlled by the present embodiment). In other words, the temperature sensor 3 should be located on the windward of an air flow, e.g. the left-side on the drawing sheet of FIG. 2. Due to the positional relationship between the temperature sensor 3 and the device module 6 shown in FIG. 2, it is possible to measure an intake temperature 4a of the device 5a (i.e. the temperature of an air flow in the direction A2) based on the measured temperature of the temperature sensor 3. Herein, the term "intake temperature" is the temperature of an air adjoining the upstream of any device. Reference sign 4b denotes an intake temperature of the device 5b, i.e. the temperature of an air flow in the direction A3. In addition, the arrow symbol A4 denotes an outlet air (or an exhaust air) output from the computer equipment 100. In this connection, the term "outlet temperature" is the temperature of an air adjoining the downstream of any device. In general, it is possible to control the revolving speed of the fan 1 based on the intake temperature of any device.

In the case of FIG. 2 where the device module 6 includes a plurality of devices 5a, 5b, it is possible to position the temperature sensor 3 in the upstream of the device module 6, but it is difficult to position the temperature sensor 3 in the downstream of the device 5a and in the upstream of the device 5b. In this case, it is possible to estimate that the device 5b may be exposed to the highest temperature irrespective of the intake temperature 4b and the operating state of the device 5b, and therefore it is possible to control the revolving speed of the fan 1 in conformity with the temperature status of the device 5b. However, this temperature control method may have a room of improvement in terms of the power saving and the noise reduction. The present embodiment is able to estimate the temperature status, which may differ for each device, even when it is impossible to provide temperature sensors for multiple devices, thus optimally control the revolving speed of a fan.

Figure 3:
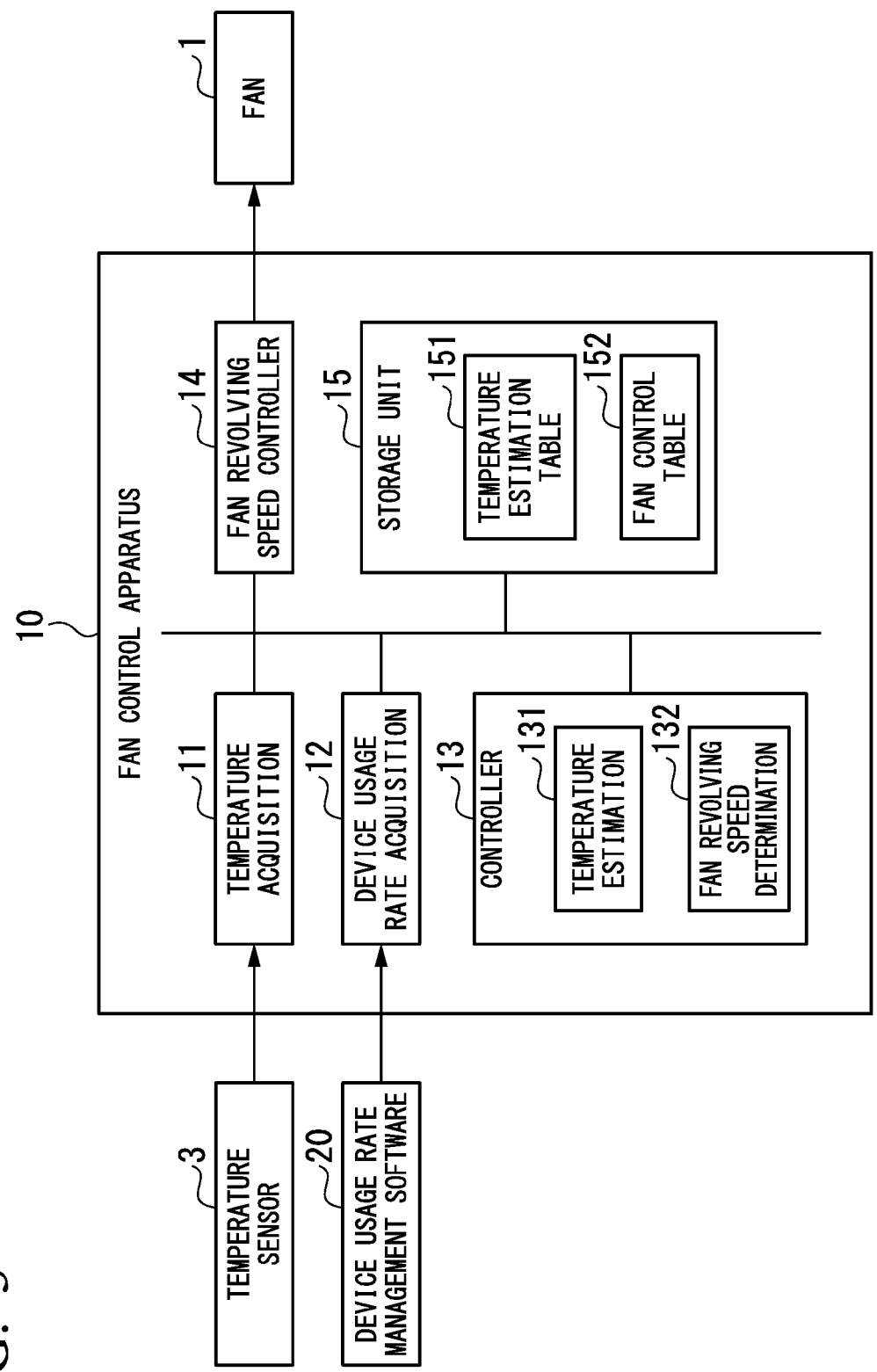
FIG. 3 is a block diagram showing the internal configuration of the fan control apparatus according to the first embodiment of the present invention.

FIG. 3 is a block diagram showing the internal configuration of the fan control apparatus 10 according to the first embodiment of the present invention, wherein the same parts as those shown in FIGS. 1 and 2 are denoted using the same reference signs; hence, the detailed descriptions thereof will be omitted here. The fan control apparatus 10 includes a temperature acquisition part 11, a device usage rate acquisition part 12, a controller 13, a fan revolving speed controller 14, and a storage unit 15.

The temperature acquisition part 11 acquires the temperature information measured by the temperature sensor 3.

The device usage rate acquisition part 12 acquires the usage rates (representing the operating states) of the devices 5a, 5b positioned in the downstream of the temperature sensor 3 by way of a device usage rate management software 20. The device usage rate management software 20 is the software executed on the operating system (OS) running with the computer equipment 100. That is, the device usage rate management software 20 is the software that monitors and manages the usage rate of each device (e.g. a video chip) utilized by the OS and its application. In particular, the device usage rate management software 20 has a function to monitor the usage rates of the devices 5a, 5b mounted on the device module 6 shown in FIG. 2.

The controller 13 controls the revolving speed of the fan 1 based on the temperature information acquired by the temperature acquisition part 11 and the usage rate information acquired by the device usage rate acquisition part 12. The controller 13 further includes the temperature estimation part 131 and the fan revolving speed determination part 132, both of which have been already described in conjunction with FIG. 1. Specific applications of those parts 131-132 will be described in conjunction with FIG. 2. The temperature estimation part 131 acquires the temperature information measured by the temperature sensor 3 (which is installed in the casing of the computer equipment 100) and the usage rate of the device 5a (referred to as a first device) positioned in the downstream of the temperature sensor 3 so as to estimate the temperature of an air in the downstream of the device 5a. The fan revolving speed determination part 132 determines the revolving speed (referred to as first revolving speed) of the fan 1 suited to cooling of the device 5a based on the temperature information of the temperature sensor 3 and the usage rate of the device 5a. In addition, the fan revolving speed determination part 132 determines the revolving speed (referred to as second revolving speed) of the fan 1 suited to cooling of the device 5b (referred to as a second device) based on the estimated temperature of the temperature estimation part 131 and the usage rate of the device 5b (which is positioned in the downstream of the device 5a). Subsequently, the fan revolving speed determination part 132 selects a higher value between the first and second revolving speeds so as to determine the selected revolving speed for the fan 1.

The fan revolving speed controller 14 operates the fan 1 at the revolving speed determined by the fan revolving speed determination part 132.

The storage unit 15 stores various pieces of information needed to control the fan 1. For example, the storage unit 15 stores a temperature estimation table 151 (which is used for estimation of the air temperature in the downstream of the device 5a (i.e. the first device) by the temperature estimation part 151) and a fan control table 152 (which is used for determination of the revolving speed of the fan 1 by the fan revolving speed determination part 132). These tables 151, 152 will be discussed with reference to FIGS. 4 to 6.

FIG. 4 shows an example of the temperature estimation table 151, i.e. a temperature estimation table 151a, stored in the storage unit 15. The temperature estimation table 151a has three items, namely "inlet temperature (4a)", "usage of device 5a", and "inlet temperature (4b)". The temperature at the air-inlet side of the device module 6 (i.e. the inlet temperature 4a) shown in FIG. 2 is registered in the item "inlet temperature (4a)" of the temperature estimation table 151a. In FIG. 2, no device (or no member) causing heat is interposed between the temperature sensor 3 and the device module 6. Therefore, the measured temperature of the temperature sensor 3 can be used for the inlet temperature 4a. In addition, no heating member is disposed in the upstream of the device 5a mounted on the device module 6. Therefore, the measured temperature of the temperature sensor 3 can be used for the inlet temperature 4a. In this connection, the inlet temperature 4a corresponds to the temperature of an inlet air flowing into the device 5a.

In the temperature estimation table 151a, the item "usage rate of device 5a" describes various ranges of usage rates. It is possible to acquire the usage rate of the device 5a by way of the device usage rate management software 20.

The outlet temperature of the device 5a (i.e. the inlet temperature 4b) is registered in the item "inlet temperature (4b)" of the temperature estimation table 151a. In FIG. 2, the inlet temperature 4b of the device 5b corresponds to the outlet temperature of the device 5a. The device 5a is subjected to high temperature as the usage rate of the device 5a becomes higher; hence, the outlet temperature of the device 5a (i.e. the inlet temperature 4b of the device 5b) becomes higher. This indicates that the inlet temperature 4b of the device 5b is correlated to the inlet temperature 4a of the device 5a and the usage rate of the device 5a. In other words, it is possible to calculate the inlet temperature 4b by way of desk calculation and actual machine simulation in advance. For this reason, pre-calculated values as the inlet temperature 4b are registered in the item "inlet temperature (4b)".

Using the temperature information measured by the temperature sensor 3 and the usage rate of the device 5a acquired by the device usage rate acquisition part 12, the temperature estimation part 131 reads the outlet temperature of the device 5a (i.e. the inlet temperature 4b) from the temperature estimation table 151a shown in FIG. 4. On the condition that the temperature sensor 3 measures the temperature information of 30° C. while the device usage rate acquisition part 151 acquires the usage rate 38% of the device 5a, for example, the temperature estimation part 131 retrieves the corresponding data (or record) from the temperature estimation table 151 using the item of "inlet temperature (4a)" at 30° C. and the item of "usage rate of device 5a" at 38%, thus reading the corresponding value (i.e. 35° C.) as the item of "inlet temperature (4b)" from the storage unit 15. Thus, it is possible to obtain the inlet temperature 4b of the device 5b even when no temperature sensor is attached to the device 5b.

FIG. 5 shows an example of the fan control table 152, i.e. a fan control table 152a, stored in the storage unit 15. The fan control table 152a of FIG. 5 is the table used for calculating the revolving speed of the fan 1 suited to the temperature status of the device 5a. In FIG. 5, the fan control table 152a has three items, namely "inlet temperature (4a)", "usage rate of device 5a", and "revolving speed of fan 1". Various ranges for the inlet temperature 4a of the device module 6 are registered in the item "inlet temperature (4a)". Various ranges for the usage rate of the device 5a are registered in the item of "usage rate of device 5a". Various values for the revolving speed of the fan 1 are registered in the item of "revolving speed of fan 1". For example, the revolving speed of the fan 1 suited to the temperature status of the device 5a can be defined as the minimum revolving speed in the range of revolving speed for maintaining the temperature range of the device 5a which would not badly affect the operation and the lifetime of the device 5a when the fan 1 operates at the revolving speed. This revolving speed of the fan 1 can be obtained by way of desk calculation and actual machine simulation and set to the fan control table 152a. The fan control table 152a shows that the item of "revolving speed of fan 1" is correlated to the item of "inlet temperature (4a)" and the item of "usage rate of device 5a". This derives from the assumption that the temperature status of the device 5a would be correlated to the temperature of an inlet air blown to the device 5a (i.e. the inlet temperature 4a) and the usage rage of the device 5a. It is necessary to cool the device 5a by increasing the revolving speed of the fan 1 since the temperature of the device 5a becomes higher as the usage rage of the device 5a becomes higher. FIG. 5 shows an example of the fan control table 152a for the device 5a, and therefore the fan control table 152a shows increasing values of the revolving speed of the fan 1 as the usage rate of the device 5a becomes higher. According to the fan control table 152a of FIG. 5, the revolving speed of the fan 1 is increased to be higher as the inlet temperature 4a of the device 5a becomes higher when the usage rate of the device 5a rests on the same range.

Using the temperature information measured by the temperature sensor 3 and the usage rate of the device 5a acquired by the device usage rate acquisition part 12, the fan revolving speed determination part 132 reads the revolving speed of the fan 1 suited to cooling of the device 5a from the fan control table 152a. On the condition that the temperature information of the temperature sensor 3 is 32° C. while the usage rate of the device 5a acquired by the device usage rate acquisition part 12 is 55%, for example, the fan revolving speed determination part 132 retrieves the corresponding data (or record) from the fan control table 152a using the item of "inlet temperature (4a)" at 32° C. and the item of "usage rate of device 5a" at 55%, thus reading the corresponding value (i.e. 6,500 rpm) as the item of "revolving speed of fan 1" from the storage unit 15. Thus, it is possible to maintain the temperature of the device 5a in an appropriate temperature range. In addition, it is possible to determine the revolving speed of the fan 1 (i.e. the first revolving speed) which may achieve low cost and save power.

FIG. 6 shows another example of the fan control table, i.e. a fan control table 152b, stored in the storage unit 15. The fan control table 152b of FIG. 6 is the table for calculating the revolving speed of the fan 1 suited to the temperature status of the device 5b. The fan control table 152b has three items, namely "inlet temperature (4b)", "usage rate of device 5b", and "revolving speed of fan 1". Various ranges for the inlet temperature 4b of the device 5b are registered in the item of "inlet temperature (4b)". Herein, the inlet temperature 4b of the device 5b corresponds to the outlet temperature of the device 5a. Various ranges for the usage rate of the device 5b are registered in the item of "usage rate of device 5b". Various values for the revolving speed of the fan 1 suited to the temperature status of the device 5b are registered in the item of "revolving speed of fan 1". Similar to the fan control table 152a of FIG. 5, the fan control table 152b of FIG. 6 describes the minimum revolving speed of the fan in the range of revolving speed of the fan 1 suited to cooling of the device 5b (i.e. the second device) which is calculated by way of desk calculation and actual machine simulation. The fan control table 152b shows that values of "revolving speed of fan 1" are set in correlation with ranges of "inlet temperature (4b)" and ranges of "usage rate of device 5b". This derives from the assumption that the temperature status of the device 5b would be correlated to the downstream temperature of the device 5a (i.e. the outlet temperature of the device 5*a*) and the operating rate of the device 5*b*. It is necessary to cool the device 5*b* by increasing the revolving speed of the fan 1 since the temperature of the device 5*b* becomes higher as the usage rate of the device 5*b* becomes higher. FIG. 6 shows an example of the fan control table 152*b* for the device 5*b*, wherein the fan control table 152*b* describes values for the revolving speed of the fan 1 which are increased as the usage rate of the device 5*b* becomes higher. According to the fan control table 152*b*, the revolving speed of the fan 1 is increased to be higher as the inlet temperature 4*b* of the device 5*b* becomes higher when the usage rate of the device 5*b* rests on the same range.

Using the temperature information estimated by the temperature estimation part 131 and the usage rate of the device 5*b* acquired by the device usage rate acquisition part 12, the fan revolving speed determination part 132 obtains the revolving speed of the fan 1 suited to cooling of the device 5*b* from the fan control table 152*b* of FIG. 6. On the condition that the temperature estimation part 131 estimates the inlet temperature 4*b* of the device 5*b* (or the outlet temperature of the device 5*a*) at 34° C. while the device usage rate acquisition part 12 acquires the usage rate of the device 5*b* at 80%, for example, the fan revolving speed determination part 132 retrieves the corresponding data (or record) from the fan control table 152*b* using the inlet temperature 4*b* of 34° C. and the usage rate 80% of the device 5*b*, thus reading the corresponding value (i.e. 7,000 rpm) as the item of "revolving speed of fan 1" from the storage unit 15. Thus, it is possible to maintain the temperature of the device 5*b* in an appropriate temperature range. In addition, it is possible to obtain the revolving speed of the fan 1 (i.e. the second revolving speed) achieving low cost and power saving.

The fan revolving speed determination part 132 selects a higher value between the first revolving speed of the fan 1 suited to cooling of the device 5*a* and the second revolving speed of the fan 1 suited to cooling of the device 5*b*. By selecting higher revolving speed, it is possible for the fan 1 to cause an adequate amount of air flow for cooling both the devices 5*a* and 5*b*.

Figure 7:
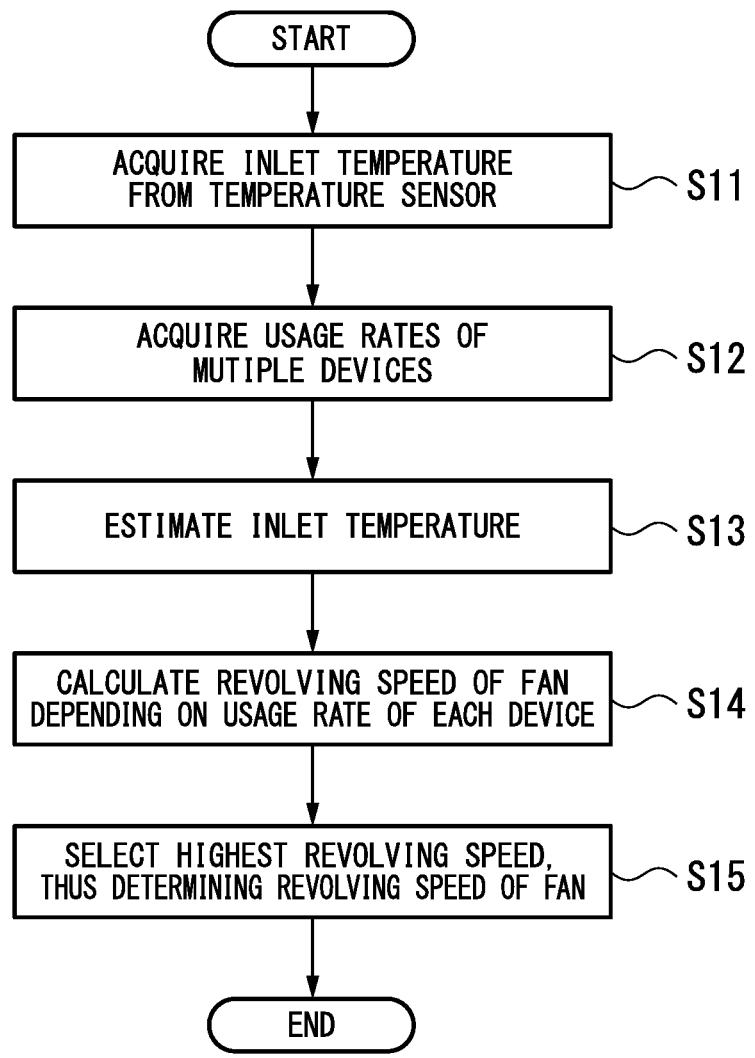
FIG. 7 is a flowchart showing a fan revolving speed determination process according to the embodiment of the present invention.

FIG. 7 is a flowchart showing a fan revolving speed determination process according to the first embodiment of the present invention. Now, the process for determining the revolving speed of the fan 1 will be described with reference to the flowchart of FIG. 7.

The fan revolving speed determination process will be carried out on the precondition that the temperature sensor 3 measures the temperature information at a predetermined time interval so as to send the measured temperature information to the temperature estimation part 131. Upon receiving an instruction of the device usage rate acquisition part 12, the device usage rate management software 20 measures the usage rates of the devices 5*a*, 5*b* at a predetermined time interval so as to send their usage rates to the device usage rate acquisition part 12.

First, the temperature estimation part 131 acquires the inlet temperature 4*a* of the device 5*a* from the temperature sensor 3 (step S11). The temperature estimation part 131 sends the inlet temperature 4*a* to the controller 13. In the controller 13, the temperature estimation part 131 receives the inlet temperature 4*a*.

Next, the device usage rate acquisition part 12 acquires the usage rates of multiple devices (e.g. the devices 5*a*, 5*b*) from the device usage rate management software 20 (step S12). The device usage rate acquisition part 12 sends the usage rates of the devices 5*a*, 5*b* to the controller 13. In the controller 13, the temperature estimation part 131 receives the usage rate of the device 5*a*. In addition, the fan revolving speed controller 132 receives the usage rates of the devices 5*a*, 5*b*.

Next, the temperature estimation part 131 estimates the inlet temperature of the device 5*b* based on the inlet temperature 4*a* of the device 5*a* and the usage rate of the device 5*a* (step S13). Specifically, the temperature estimation part 131 reads the inlet temperature 4*b* of the device 5*b*, which is correlated to the inlet temperature 4*a* and the usage rate of the device 5*a*, from the temperature estimation table 151*a* of the storage unit 15. The temperature estimation part 131 sends the read inlet temperature 4*b* to the fan revolving speed determination part 132.

Next, the fan revolving speed determination part 132 determines the revolving speed of the fan 1 based on the usage rates of the devices 5*a*, 5*b* (step S14). First, the fan revolving speed determination part 132 determines the revolving speed of the fan 1 (i.e. the first revolving speed). Specifically, the fan revolving speed determination part 132 reads the revolving speed of the fan 1, which is correlated to the inlet temperature 4*a* and the usage rate of the device 5*a*, from the fan control table 152*a* of the storage unit 15 shown in FIG. 5. The read revolving speed indicates the first revolving speed. In addition, the fan revolving speed determination part 132 determines the revolving speed of the fan 1 (i.e. the second revolving speed). Specifically, the fan revolving speed determination part 132 reads the revolving speed of the fan 1, which is correlated to the inlet temperature 4*b* and the usage rate of the device 5*b*, from the fan control table 152*b* of the storage unit 15 shown in FIG. 6. The read revolving speed indicates the second revolving speed.

Next, the fan revolving speed determination part 132 selects the highest revolving speed between the first and second revolving speeds, thus determining the optimum revolving speed of the fan 1 (step S15). Specifically, the fan revolving speed determination part 132 compares the first and second revolving speeds so as to select a higher value. The selected revolving speed indicates the optimum revolving speed of the fan 1. The fan revolving speed determination part 132 sends the selected revolving speed of the fan 1 to the fan revolving speed controller 14. The fan revolving speed controller 14 controls the fan 1 such that its revolving speed will match the revolving speed determined by the fan revolving speed determination part 132. Thereafter, the fan control apparatus 10 repeats a series of steps S11 to S15 so as to control the revolving speed of the fan 1.

In the computer equipment 100 of FIG. 2 that prevents a temperature sensor from being attached to the device module 6 (e.g. an add-in card), it is uncertain to determine the temperature of the device 5*a*, the temperature of the device 5*b*, and the inlet temperature 4*b*. For this reason, it is inevitable for the conventional technology to control the revolving speed of the fan 1 by estimating the highest temperature status for the devices 5*a*, 5*b*. In this case, it is likely that the fan 1 will be control at an unnecessarily higher value of revolving speed. In contrast, the present embodiment is designed to estimate the inlet temperature 4*b* based on the inlet temperature 4*a* and the usage rate of the device 5*a*. This makes it possible to determine the optimum revolving speed of the fan 1 depending on the temperature status of any device, which prevents a temperature sensor from being attached thereto, based on the inlet temperature 4*a* and the usage rate of the device 5*a* as well as the inlet temperature 4*b* and the usage rate of the device 5*b*. Thus, it is possible to operate the fan 1 at adequate revolving speed enough to cool all the devices installed in the computer equipment. In addition, the present embodiment is able to prevent the fan 1 to operate at an unnecessary higher value of revolving speed; hence, it is possible to achieve power saving and the reduction of noise due to the operation of the fan 1.

As described above, the devices 5a, 5b are detachably attached to the device module 6. Next, the fan control method for the fan 1 will be described with respect to two scenarios concerning the device 5a or 5b that is not attached to the device module 6.

(i) First Scenario

In the first scenario that the device 5a is not attached to the device module 6, the inlet temperature 4a indicates the inlet temperature of the device 5b. The fan revolving speed determination part 132 determines the revolving speed of the fan 1 with reference to the fan control table 152b of FIG. 6 using the inlet temperature 4a and the usage rate of the device 5b. In this case, the fan revolving speed determination part 132 compares the value registered in the item of "inlet temperature (4b)" with the inlet temperature 4a measured by the temperature sensor 3 with reference to the fan control table 152b. The fan revolving speed determination part 132 determines the fan revolving speed of the fan 1 suited to cooling of the device 5b as the final revolving speed for the fan 1.

(ii) Second Scenario

In the second scenario that the device 5a is not attached to the device module 6, it is possible to adopt the foregoing process that has been described with reference to FIG. 7.

Figure 8:
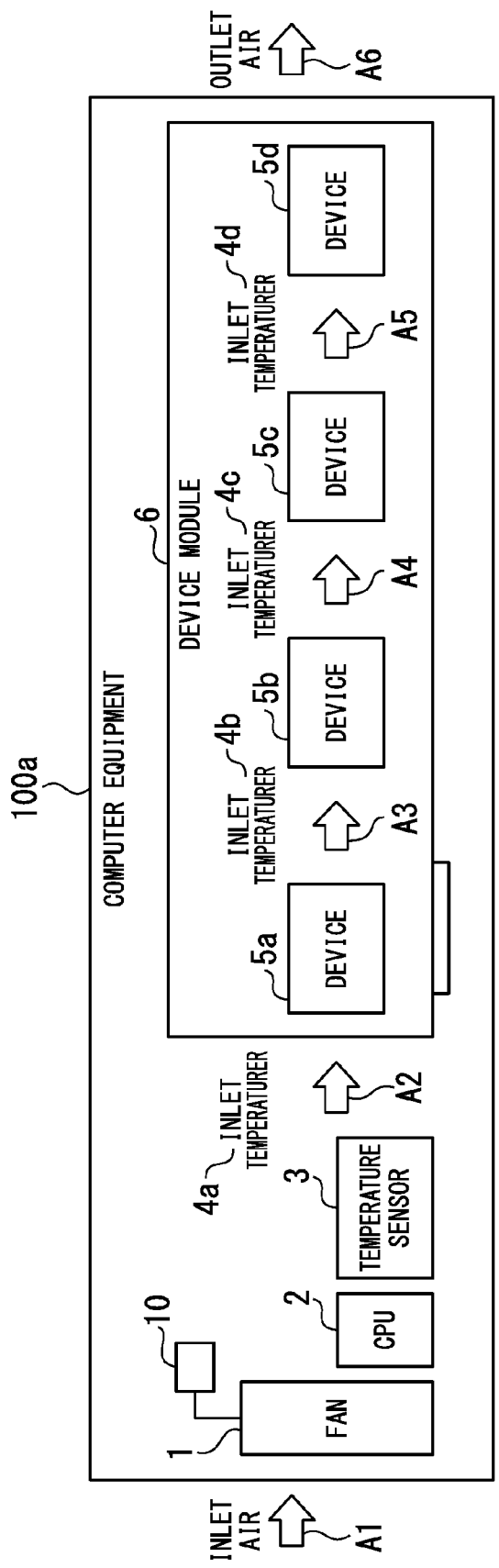
FIG. 8 is a block diagram of computer equipment implementing a fan control system according to the second embodiment of the present invention.
Figure 9:
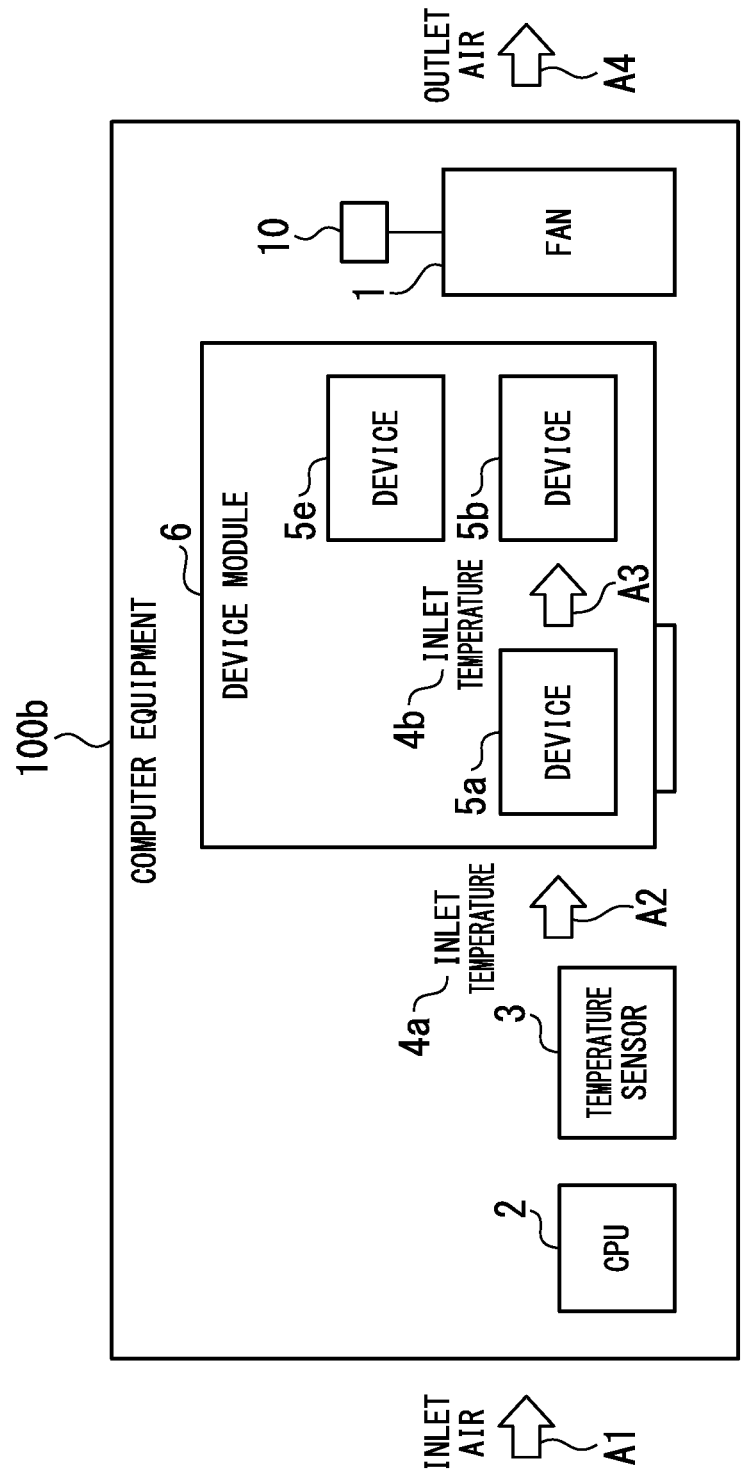
FIG. 9 is a block diagram of computer equipment implementing a fan control system according to the third embodiment of the present invention.
Figure 10:
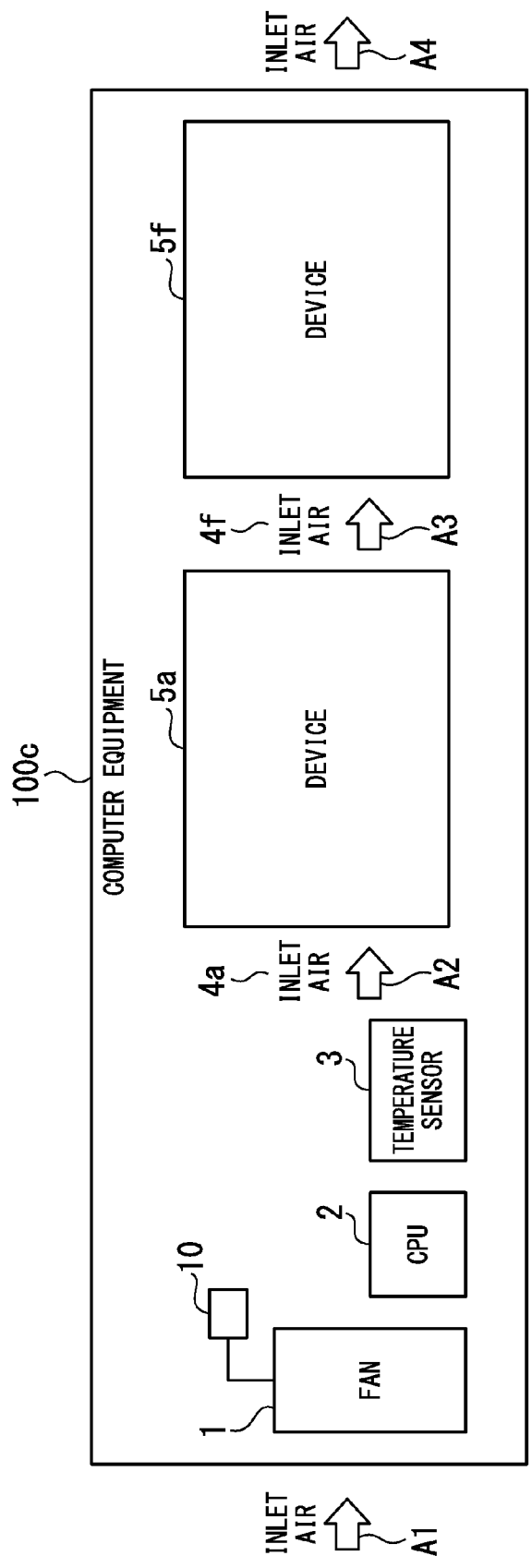
FIG. 10 is a block diagram of computer equipment implementing a fan control system according to the fourth embodiment of the present invention.

The fan control method of the present invention is not necessarily applied to the computer equipment 100 of FIG. 2; hence, it is possible to modify the fan control method adapted to other embodiments of computer equipment shown in FIGS. 8 to 10, wherein the same parts as those shown in FIG. 2 are denoted using the same reference signs; hence, detailed descriptions thereof will be omitted as necessary.

2. Second Embodiment

FIG. 8 is a block diagram of computer equipment 100a implementing a fan control system according to the second embodiment of the present invention. Similar to the computer equipment 100 of FIG. 2, the fan 1, the CPU 2, the temperature sensor 3, and the device module 6 are aligned along an air flow inside the casing of the computer equipment 100a. In FIG. 8, the device module 6 includes three devices 5a, 5b, 5c that are aligned in a direction from the upstream to the downstream of an air flow. Arrow symbols A1 through A6 show an air flow caused by the fan 1. In the computer equipment 100a of FIG. 8, the fan control apparatus 10 controls the revolving speed of the fan 1 such that the temperatures of the devices 5a, 5b, 5c will fall within an appropriate range of temperature. Three types of temperature estimation tables 151a through 151c are stored in the storage unit 15. Specifically, the outlet temperature (i.e. the inlet temperature 4b of the device 5b) is registered in the temperature estimation table 151a in correspondence with the inlet temperature 4a and the usage rate of the device 5a; the outlet temperature of the device 5b (i.e. an inlet temperature 4c of the device 5c) is registered in the temperature estimation table 151b in correspondence with the inlet temperature 4b and the usage rate of the device 5b; the outlet temperature of the device 5c (i.e. an inlet temperature 4d of the device 5d) is registered in the temperature estimation tale 151c in correspondence with the inlet temperature 4c and the usage rate of the device 5c. In addition, four types of fan control tables 152a through 152d are stored in the storage unit 15. Specifically, the revolving speed of the fan 1 is registered in the fan control table 151a in correspondence with the inlet temperature 4a and the usage rage of the device 5a; the revolving speed of the fan 1 is registered in the fan control tale 151b in correspondence with the inlet temperature 4b and the usage rate of the device 5b; the revolving speed of the fan 1 is registered in the fan control table 152c in correspondence with the inlet temperature 4c and the usage rate of the device 5c; the revolving speed of the fan 1 is registered in the fan control table 152d in correspondence with the inlet temperature 4d and the usage rate of the device 5d.

The processing of the fan control apparatus 10 adapted to the computer equipment 100a will be described with reference to the flowchart of FIG. 7. First, the temperature estimation part 131 acquires the inlet temperature 4a (step S11). The device usage rate acquisition part 12 acquires the usage rates of the devices 5a, 5b, 5c, and 5d (step 12). Next, the temperature estimation part 131 estimates the inlet temperature 4b of the device 5b with reference to the temperature estimation table 151a using the measured inlet temperature 4a of the device 5a (which is measured by the temperature sensor 3 and the usage rate of the device 5a. Similarly, the temperature estimation part 131 estimates the inlet temperature 4c of the device 5c with reference to the temperature estimation table 151b using the estimated inlet temperature 4b and the usage rate of the device 5b. The temperature estimation part 131 estimates the inlet temperature 4d of the device 5d with reference to the temperature estimation table 151c using the estimated inlet temperature 4c and the usage rate of the device 5c (step S13).

Next, the fan revolving speed determination part 132 determines the revolving speed of the fan 1 suited to the temperature status of the device 5a with reference to the fan control table 152a using the inlet temperature 4a and the usage rate of the device 5a. The fan revolving speed determination part 132 determines the revolving speed of the fan 1 suited to the temperature status of the device 5b with reference to the fan control table 152b using the inlet temperature 4b and the usage rate of the device 5b. The fan revolving speed determination part 132 determines the revolving speed of the fan 1 suited to the temperature status of the device 5c with reference to the fan control table 152c using the inlet temperature 4c and the usage rate of the device 5c. The fan revolving speed determination part 132 determines the revolving speed of the fan 1 suited to the temperature status of the device 5d with reference to the fan control table 152d using the inlet temperature 4d and the usage rate of the device 5d (step S14).

Next, the fan revolving speed determination part 132 selects the highest value among the revolving speeds of the fan 1 suited to the temperature statuses of the devices 5a through 5d, thus determining the optimum revolving speed of the fan 1 (step S15).

In the situation that the device module 6 includes three or more devices 5 aligned along an air flow, it is possible for the present embodiment to estimate the outlet temperature of each device based on its inlet temperature and usage rate; in other words, it is possible to estimate the inlet temperature for each of the devices aligned from the upstream to the downstream of an air flow by repeating the process of estimating the inlet temperature of a subsequent device adjoining each device in the downstream side of an air flow. In addition, it is possible to estimate the temperature status of each device based on the estimated inlet temperature of each device and its usage rate obtained from the device usage rate management software 20. Moreover, it is possible to determine the revolving speed of the fan 1 able to supply an adequate cooling air depending on the temperature status of each device. Thus, it is possible for the fan control apparatus 10 to optimally control the fan 1 in the computer equipment 100a of FIG. 8 including three or more devices 5 linearly aligned along an air flow.

3. Third Embodiment

FIG. 9 is a block diagram of computer equipment 100b implementing a fan control system according to the third embodiment of the present invention. In the computer equipment 100b of FIG. 9, the device module 6 includes three devices 5a, 5b, and 5e. Similar to the device module 6 shown in FIG. 2, the device module 6 shown in FIG. 9 includes a pair of devices 5a, 5b aligned along an air flow. In addition, the device module 6 of FIG. 9 further includes the device 5e juxtaposed to the device 5b, wherein a pair of devices 5b, 5e are aligned in a perpendicular direction to the air-flow direction. Moreover, the computer equipment 100b of FIG. 9 differs from the computer equipment 100 of FIG. 2 in that the fan 1 is disposed in the downstream side of an air flow in the casing. Similar to the computer equipment 100, the computer equipment 100b has the same positional relationship of the CPU 2 and the temperature sensor 3. In this connection, it is possible to place the fan 1 at an arbitrary position in the casing of the computer equipment 100b as long as the positional relationship between the CPU 2 and the temperature sensor 3 can be maintained as shown in FIG. 2. In the computer equipment 100b, the fan 1 blows in air so as to cause the air flow shown by arrow symbols A1 through A4.

In the case of the computer equipment 100b, the temperature estimation table 151a, the fan control table 152a, the fan control table 152b, and a fan control table 152e are stored in the storage unit 15 of the fan control apparatus 10. Specifically, the outlet temperature of the device 5a (i.e. the inlet temperature 4b of the device 5b) is registered in the temperature estimation table 151a in correspondence with the inlet temperature 4a and the usage rate of the device 5a. In addition, the revolving speed of the fan 1 is registered in the fan control table 152a in correspondence with the inlet temperature 4a and the usage rate of the device 5a; the revolving speed of the fan 1 is registered in the fan control table 152b in correspondence with the inlet temperature 4b and the usage rate of the device 5b; the revolving speed of the fan 1 is registered in the fan control table 152e in correspondence with the inlet temperature and the usage rate of the device 5e. In the case of the device module 6 shown in FIG. 9, it is possible to use the outlet temperature of the device 5a (i.e. the inlet temperature 4b of the device 5b) as the inlet temperature of the device 5e.

Next, the processing of the fan control apparatus 10 adapted to the computer equipment 100b will be described with reference to the flowchart of FIG. 7. The revolving speed of the fan 1 depending on the temperature statuses of the devices 5a, 5b has been described with reference to FIG. 7. Therefore, the revolving speed of the fan 1 depending on the temperature status of the device 5e will be described below. Herein, a series of steps S11 through S13 shown in FIG. 7 are similarly applied to the fan revolving speed determination process for the device 5e. The fan revolving speed determination part 132 determines the revolving speed of the fan 1 depending on the temperature status of the device 5e with reference to the fan control table 152e using the inlet temperature 4b and the usage rate of the device 5e (step S14). Then, the fan revolving speed determination part 132 selects the highest value among the revolving speeds of the fan 1 which are determined for the devices 5a, 5b, and 5e, thus determining the optimum revolving speed of the fan 1 (step S15).

In the device module 6 that the device 5e is juxtaposed to the device 5b adjoining the device 5a in the downstream side, it is possible to determine the revolving speed of the fan 1 depending on the temperature status of the device 5e by using the outlet temperature of the device 5a as the inlet temperature of the device 5e.

4. Fourth Embodiment

FIG. 10 is a block diagram of computer equipment 100c implementing a fan control system according to the fourth embodiment of the present invention. In the computer equipment 100c, a device 5f is disposed subsequent to the device 5a in the downstream side without using the device module 6. The first to third embodiments are designed to determine the revolving speed of the fan 1 by estimating the temperature status of a subsequent device (e.g. the device 5b) which is installed in the device module 6 but is not equipped with its temperature sensor. The fourth embodiment differs from the first to third embodiments such that it estimates the temperature status of the device 5f disposed subsequent to the device 5a in the downstream side so as to control the fan 1 depending on the estimated temperature status.

In the case of the computer equipment 100c of FIG. 10, the fan control apparatus 10 stores the temperature estimation table 151a, which registers the outlet temperature of the device 5a (i.e. an inlet temperature 4f of the device 5f) in correspondence with the inlet temperature 4a and the usage rate of the device 5a, in the storage unit 15. In addition, the storage unit 15 stores a fan control table 152f that registers the revolving speed of the fan 1 in correspondence with the inlet temperature 4f and the usage rate of the device 5f in addition to the fan control table 152a that registers the revolving speed of the fan 1 in correspondence with the inlet temperature 4a and the usage rate of the device 5a.

Next, the processing of the fan control apparatus 10 adapted to the computer equipment 100c will be described with reference to the flowchart of FIG. 7. Herein, the fan revolving speed determination process concerning the device 5a has been described with reference to FIG. 7. Therefore, the fan revolving speed determination process concerning the device 5f will be described with reference to FIG. 7. A series of steps S11 through S13 are similarly applied to the fan revolving speed determination process concerning the device 5f. The fan revolving sped determination part 132 determines the revolving speed of the fan 1 depending on the temperature status of the device 5f with reference to the fan control table 152f using the inlet temperature 4f and the usage rate of the device 5f (step S14). Then, the fan revolving speed determination part 132 selects a higher value between the revolving speeds of the fan 1 that are determined for the devices 5a, 5f, thus determining the optimum revolving speed of the fan 1 (step S15).

As described above, the fan control apparatus 10 of the present embodiment is able to optimize the revolving speed of the fan 1 irrespective of whether or not the device 5a and its subsequent device are mounted on the device module 6 such as an add-in card.

The fan control apparatus 10 implements a computer system, wherein programs implementing the foregoing processes are stored on computer-readable storage media; hence, the computer system reads and executes those programs so as to implement the foregoing processes. Herein, the term "computer-readable storage media" refer to magnetic disks, magneto-optical disks, CD-ROM, DVD-ROM, semiconductor memory, and the like. In addition, it is possible to distribute computer programs to a computer system through communication lines, and therefore the computer system may execute computer programs. The programs may embody part of the foregoing functions. Alternatively, the programs may be differential programs (or differential files) which are combined with pre-installed programs of a computer system so as to implement the foregoing functions.

Moreover, part of or the entirety of the functions of the fan control apparatus 10 can be realized using hardware components such as ASIC (Application Specific Integrated Circuit), PLD (Programmable Logic Device), FPGA (Field Programmable Gate Array), and PLC (Programmable Logic Controller).

Lastly, the present invention is not necessarily limited to the foregoing embodiments, which can be further modified by changing or replacing constituent elements within the scope of the invention as defined by the appended claims.

What is claimed is:

1. A fan control apparatus adapted to a computer equipment including a fan configured to sequentially cool first and second devices operating at first and second usage rates and a temperature sensor configured to measure an inlet temperature applied to the first device of the computer equipment, the fan control apparatus comprising:
   a controller configured to estimate an outlet temperature of the first device as an inlet temperature of the second device based on the inlet temperature of the first device and the first usage rate and to thereby determine a first revolving speed of the fan based on the inlet temperature of the first device and the first usage rate and a second revolving speed of the fan based on the inlet temperature of the second device and the second usage rate; and
   a fan revolving speed controller configured to control the fan to operate at an optimum revolving speed based on the first revolving speed and the second revolving speed.

2. A fan control system adapted to a computer equipment including first and second devices aligned together, comprising:
   a fan configured to cool the first and second devices operating at first and second usage rates inside the computer equipment;
   a temperature sensor configured to measure an inlet temperature applied to the first device of the computer equipment; and
   a fan control apparatus
   configured to estimate an outlet temperature of the first device as an inlet temperature of the second device based on the inlet temperature of the first device and the first usage rate and to thereby determine a first revolving speed of the fan based on the inlet temperature of the first device and the first usage rate and a second revolving speed of the fan based on the inlet temperature of the second device and the second usage rate, thus controlling the fan to operate at an optimum revolving speed based on the first revolving speed and the second revolving speed.

3. The fan control system according to claim 2, wherein the first and second devices are detachably mounted on a device module installed inside the computer equipment.

4. A computer equipment comprising:
   a device module including first and second devices aligned together; a temperature sensor configured to measure an inlet temperature of the device module;
   a fan configured to cool the first and second devices operating at first and second usage rates in the device module;
   a storage unit including a temperature estimation table configured to store an outlet temperature of each device in correspondence with an inlet temperature and a usage rate of each device and a fan control table configured to store a revolving speed of the fan in correspondence with the inlet temperature and the usage rate of each device; and
   a fan control apparatus configured to
   estimate an outlet temperature of the first device as an inlet temperature of the second device based on the inlet temperature of the first device and the first usage rate with reference to the temperature estimation table and to thereby determine a first revolving speed of the fan based on the inlet temperature of the first device and the first usage rate and a second revolving speed of the fan based on the inlet temperature of the second device and the second usage rate with reference to the fan control table, thus controlling the fan to operate at an optimum revolving speed based on the first revolving speed and the second revolving speed.

5. A fan control method adapted to a computer equipment including a fan configured to cool first and second devices operating at first and second usage rates and a temperature sensor configured to measure an inlet temperature applied to the first device of the computer equipment, the fan control method comprising:
   estimating an outlet temperature of the first device as an inlet temperature of the second device based on the inlet temperature of the first device and the first usage rate;
   determining a first revolving speed of the fan based on the inlet temperature of the first device and the first usage rate and a second revolving speed of the fan based on the inlet temperature of the second device and the second usage rate; and
   controlling the fan to operate at an optimum revolving speed based on the first revolving speed and the second revolving speed.

6. A non-transitory computer-readable storage medium having stored a program causing a computer serving as a fan control apparatus to implement the fan control method according to claim 5.

* * * * *